United States Patent [19]
Metcalfe

[11] 3,917,287
[45] Nov. 4, 1975

[54] FACE SEALS
[76] Inventor: Kenneth Metcalfe, 23 Queengate, Nelson, Lancashire, England
[22] Filed: July 2, 1973
[21] Appl. No.: 375,595

[30] Foreign Application Priority Data
July 5, 1972 United Kingdom............... 31452/72

[52] U.S. Cl. ................................................. 277/38
[51] Int. Cl.² .......................................... F16J 15/36
[58] Field of Search .............................. 277/38–44, 277/9

[56] References Cited
UNITED STATES PATENTS

| | | | |
|---|---|---|---|
| 2,615,739 | 10/1941 | Vedovell | 277/41 |
| 2,824,760 | 2/1958 | Gits | 277/40 |
| 2,844,393 | 7/1958 | Jensen | 277/40 |
| 2,907,594 | 10/1959 | Macks | 277/40 |
| 3,026,114 | 3/1962 | Andresen et al. | 277/40 |
| 3,050,319 | 8/1962 | Colby | 277/41 |
| 3,554,559 | 1/1971 | Dahlheimer | 277/41 |

Primary Examiner—Robert I. Smith
Attorney, Agent, or Firm—Diller, Brown, Ramik & Wight

[57] ABSTRACT

In a so-called face seal or sliding ring seal such as may be used on an automobile water pump shaft and which comprises a pair of seal components resiliently urged into an abutting and sealing relation with one another, one of the seal components being carried on the shaft and the other on a housing wall or like member through which the shaft passes, the invention provides a clip, preferably of a plastic material, for holding the two seal components together prior to assembly in their working environment.

10 Claims, 2 Drawing Figures

—FIG.1—

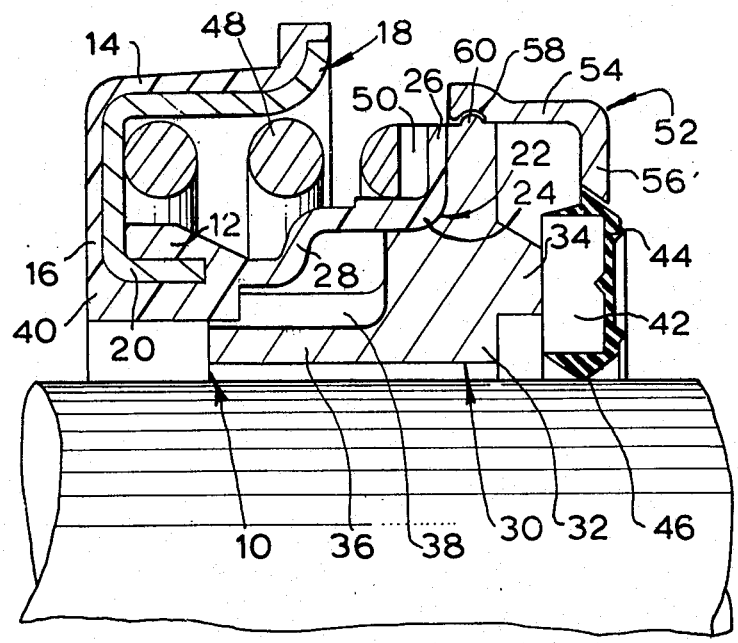
—FIG.1—
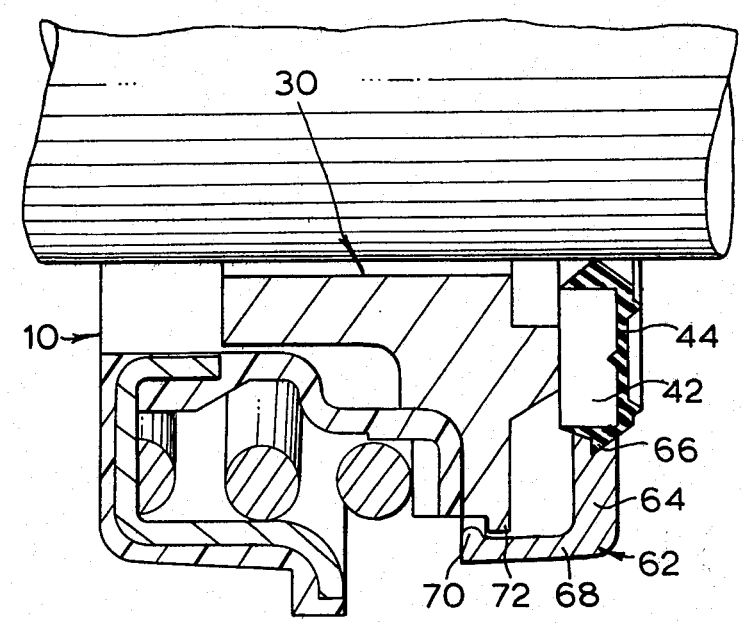
—FIG.2—

3,917,287

FACE SEALS

This invention concerns shaft seals and relates more particularly to so-called face seals or sliding ring seals, that is to say, seals which are required to maintain a differential pressure boundary between two contiguous regions containing different fluids and into both of which a rotatable shaft extends.

Many seals which satisfactorily meet these requirements are already available and such seals usually comprise a pair of seal components provided one on the shaft and the other on a housing or other member through which the shaft passes, the two seal components being resiliently urged into intimate abutting relation with one another. In most constructions, the resilient sealing force is exerted by a spring acting upon one of the seal components, generally referred to as the face seal, the other seal component being a counterface surface formed directly on the housing itself or on a counterface element mounted on the housing. The latter arrangement is generally preferred since it facilitates the provision of a counterface surface formed to precision tolerances and in a material predetermined to achieve an optimum working relationship with the face seal component.

According to the present invention, a face seal assembly comprises a face seal component, a counterface component therefor and retainer means extending between said face seal component and said counterface component to unite said components into a single assembly wherein they are retained in axially adjoining relation with one another.

By combining the seal components, including the counterface component, into a single assembly the invention thus simplifies stocking and supply requirements both for the seal manufacturer and for the seal user. Installation of the seal into its position of use is also simplified whilst the fact that both the face seal and counterface components are retained together at all times protects the high precision rubbing faces on the two components from damage during transport and storage.

In a preferred embodiment of the invention, the face seal component is an interference fit, or has a portion which is an interference fit, in a carrier member formed integrally with an elastomeric annular seal intended to be received within a cooperating recess of the abovementioned housing, the annular seal and carrier member being joined together by an interposed fold or bellows which permits a degree of axial displacement of the face seal component relative to the annular seal in order to facilitate the resilient engagement of the face seal component with the counterface component. Conveniently, a spring arranged to urge the face seal component against the counterface component is positioned between the annular seal and the carrier member and a rigid annular shell providing a seating for the spring is integrally embodied in the annular seal when the latter is being moulded, the shell accordingly acting additionally as a reinforcement for the annular seal, with the elastomeric material of the latter covering the exterior of the shell.

The retainer means by which the face seal and counterface components are held together preferably takes the form of an annular clip of a semi-flexible material, such as a plastics material, which is a push fit on one of said components but is free to rotate relative to the other component.

The invention will be described further, by way of example, with reference to the accompanying drawings, in which:

FIG. 1 is an axial section through a face seal assembly embodying the invention, and FIG. 2 is a similar section through a modification thereof.

In the face seal assembly illustrated in FIG. 1, an annular seal 10 moulded in a natural or synthetic elastomeric material comprises an axially directed, radially inner limb 12, a similarly directed, radially outer limb 14 and a radially directed limb 16 joining the limbs 12 and 14. A correspondingly shaped metal shell 18 is incorporated integrally into the annular seal 10 when the latter is being moulded and has a radially inner limb 20 embedded within the seal limb 12. It will be observed that the shell 18 is externally completely covered by the elastomeric material of the annular seal.

A carrier member 22 having a cylindrical body member 24 terminating in an outwardly directed radial flange 26 is joined to the inner limb 12 of the annular seal by a fold or bellows 28 which by virtue of its shape permits a degree of axial displacement of the carrier member 22 relative to the annular seal 10. Within the carrier member 22 there fits a face seal component 30, a body portion 32 of which is recessed at its rear face to complement the body portion 24 and radial flange 26 of the carrier member. The front face of the face seal component 30 has a raised annular rib 34 of which the free axial end surface constitutes one of the precision sealing surfaces of the face seal assembly, while a cylindrical skirt 36 extends in an axially opposite direction from the rear of the body portion 32 and into the inner limb 12 of the annular seal 10. The skirt 36 is formed with a number of circularly spaced, axially directed grooves of which one such groove 38 is visible in the drawing and the inner limb 12 of the annular seal is provided with corresponding ribs 40, each of which engages a groove 33 in order to maintain the annular seal 10 and the face seal component 30 rotationally fixed relative to one another.

Adjacent the face seal component 30 there is arranged a counterface component 42 of which the radially inner and outer surfaces together with the axially outer end surface are encased in a natural or synthetic rubber or similarly flexible shroud 44 and the shroud 44 will be seen to be formed at its radially inner surface with a sharp sealing lip 46 which is dimensioned to be an interference fit on a shaft with which the assembly is intended to be used, so that in use, the counterface component will rotate with the shaft. A helical spring 48 seated at one end in the metal shell 18 and bearing at its other end behind the flange 26 of the carrier member 22, with a washer 50 interposed between the two, is provided to urge the face seal component towards the counterface component.

To enable the face seal assembly as a whole to be handled as a single unit, the invention provides a retainer in the form of an annular clip 52 which is made of a semi-flexible material, for example a plastics material such as a suitably compounded polythene or polytetrafluorethylene. The clip 52 has a generally cylindrical body 54 which at its axially outer end carries a radially inwardly directed flange 56 and at its axially inner end is circularly grooved as indicated at 58 in order to clip on to a cooperating circular rib 60 provided on a radial flange 33 of the face seal component 30. The free end of the clip flange 56 and the facing radially outer surface of the shroud 44 of the counterface component are complementarily conically shaped so that the counterface component 42 is prevented from moving axially outwardly from the face seal component 30 but it will be noted that the clip and the counterface component are radially spaced from one another so that rotation of the counterface component with the shaft is not impeded.

The face seal assembly illustrated in FIG. 2 represents a modification of that just described, only in that the retaining clip is arranged to be fixed to and to rotate with the counterface component instead of being fixed to the face seal component. For this purpose, the retainer clip 62 shown in FIG. 2 has its radial flange 64 notched to engage firmly over a sharp radial rib 66 provided on the outer circumference of the shroud 44 of the counterface component 42 while the free end of the body 68 of the clip is formed internally with a circular bead 70 which cooperates with a radial flange 72 of the face seal component to prevent axial dislodgement of the counterface component. Radial clearance is, of course, provided between the clip body 68 and the flange 72 in order to permit free rotation of the counterface component and the clip.

I claim:

1. A fluid assembly comprising a face seal component and a counterface seal component disposed in axially adjacent relation, and retainer means releaseably interconnecting said seal components, said retainer means being in the form of a clip in axial retaining relation with one of said seal components, and releaseable interlockable connection means between said clip and the other of said seal components for releaseably securing said clip to said other seal component and for facilitating assembly and disassembly of said seal components.

2. A fluid face seal assembly as set forth in claim 1, further comprising a radial flange on said clip having a surface circumscribing an adjacent surface of said counterface seal component, said surfaces having complementary conical configurations whereby said clip acts to retain said counterface seal component united with said face seal component.

3. The fluid seal assembly of claim 1 wherein said clip is formed of a semi-rigid plastics material.

4. The fluid seal assembly of claim 1 wherein said clip is formed of a semi-rigid plastics material and said releaseably interlockable connection means is of the radial projection and recess type.

5. The fluid seal assembly of claim 1 wherein said releaseable interlockable connection means includes an axial projection on said other seal component and cooperating releaseable radial projection and recess means on said axial projection and said clip.

6. The fluid seal assembly of claim 5 wherein said axial projection of said other component has an axial face, and said clip retains said one seal component in axially engaging relative rotatable contact with said axial face.

7. The fluid seal assembly of claim 1 wherein said releaseable interlockable connection means includes an annular flange on said other seal component and an annular bead on said clip releaseably locked axially behind said annular flange.

8. The fluid seal assembly of claim 1 wherein said one seal component is said counterface seal component, there is an interlocking connection means between said counterface seal component and said clip for uniting said counterface seal component and said clip for rotation in unison, and said releaseable interlockable connection means is of the circumferentially free type for permitting relative rotation between said clip and said face seal component.

9. The fluid seal assembly of claim 8 wherein said other seal component is said face seal component, said face seal component has an axial extension, circumferentially continuous axially extensible means between said face seal component and said axial extension interconnecting the same, and resilient means between said face seal component and said axial extension for resiliently urging axial separation of the same.

10. The fluid seal assembly of claim 9 together with separate axially relatively movable interlocking means between said face seal component and said axial projection for preventing relative circumferential movement between said face seal component and said axial projection.

* * * * *